(12) United States Patent
O'Neil et al.

(10) Patent No.: US 7,421,445 B2
(45) Date of Patent: *Sep. 2, 2008

(54) SYSTEM AND METHOD FOR RELATIONAL REPRESENTATION OF HIERARCHICAL DATA

(75) Inventors: Patrick Eugene O'Neil, Cambridge, MS (US); Elizabeth Jean O'Neil, Cambridge, MS (US); Shankar Pal, Redmond, WA (US); Gideon Schaller, Bellevue, WA (US); Istvan Cseri, Redmond, WA (US); Jose A. Blakeley, Bothell, WA (US); Nigel Clifton Westbury, Mercer Island, WA (US); Sameet Agarwal, Redmond, WA (US); F. Soner Terek, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 529 days.

This patent is subject to a terminal disclaimer.

(21) Appl. No.: 10/924,704

(22) Filed: Aug. 24, 2004

(65) Prior Publication Data

US 2005/0027743 A1   Feb. 3, 2005

Related U.S. Application Data

(63) Continuation of application No. 09/997,531, filed on Nov. 30, 2001, now Pat. No. 6,889,226.

(51) Int. Cl.
G06F 7/00 (2006.01)
G06F 17/00 (2006.01)

(52) U.S. Cl. .................................................. 707/102

(58) Field of Classification Search ............... 707/1–3, 707/10, 100–103
See application file for complete search history.

(56) References Cited

U.S. PATENT DOCUMENTS

| | | | |
|---|---|---|---|
| 5,781,906 A | 7/1998 | Aggarwal et al. | 707/102 |
| 5,873,087 A | 2/1999 | Brosda et al. | 707/100 |
| 6,240,407 B1 * | 5/2001 | Chang et al. | 707/2 |
| 6,721,727 B2 | 4/2004 | Chau et al. | 707/3 |

(Continued)

OTHER PUBLICATIONS

"The Design and Performance Evaluation of Alternative XML Storage Strategies", Sigmod Record, vol. 31, No. 1, Mar. 2002).*

(Continued)

Primary Examiner—John Cottingham
Assistant Examiner—Susan F Rayyan
(74) Attorney, Agent, or Firm—Woodcock Washburn LLP (57) ABSTRACT

A technique for representing the structure of hierarchically-organized data in a non-hierarchical data structure, such as a relation. The hierarchically-organized data is represented as a tree, and each node in the tree is assigned a position identifier that represents both the depth level of the node within the hierarchy, and its ancestor/descendant relationship to other nodes. The data represented by each node, as well as its position identifier, is stored in a row of a relational database, thereby capturing the hierarchical structure of the data in such relational database. A technique is provided for the compressed storage of position identifiers in a format that allows an efficient bytewise comparison of position identifiers to determine relative order and ancestry.

20 Claims, 5 Drawing Sheets

U.S. PATENT DOCUMENTS

| | | |
|---|---|---|
| 6,889,226 B2 | 5/2005 | O'Neil et al. ............... 707/100 |
| 7,117,436 B1 * | 10/2006 | O'Rourke et al. ........... 715/517 |
| 2002/0087571 A1 | 7/2002 | Stapel et al. ................ 707/100 |
| 2002/0116371 A1 * | 8/2002 | Dodds et al. .................... 707/3 |

OTHER PUBLICATIONS

David, M.M., "SQL-Based XML, Structured Data Access," *WEB Techniques*, Jun. 1999, 4(6), 67-68, 70, 72.

\* cited by examiner

| | ORDPATH | NAME ID | TYPE | VALUE |
|---|---|---|---|---|
| 402 | 1. | 0010 (DOCUMENT) | 1 (Element) | NULL |
| 404 | 1.1 | 0033 (ISBN) | 2 (Attribute) | 1-55860-438-3 |
| 406 | 1.3 | 0011 (TITLE) | 1 (Element) | Tree Frogs |
| 408 | 1.5 | 0012 (SECTION) | 1 (Element) | NULL |
| 410 | 1.5.1 | NULL | 4 (Value) | 1. All right thinking people |
| 412 | 1.5.3 | 0013 (BOLD) | 1 (Element) | love |
| 414 | 1.5.5 | NULL | 4 (Value) | tree frogs. |

SYSTEM AND METHOD FOR RELATIONAL REPRESENTATION OF HIERARCHICAL DATA

This application is a continuation of U.S. patent application Ser. No. 09/997,531, entitled "System and Method for Relational Representation of Hierarchical Data," filed Nov. 30, 2001.

FIELD OF THE INVENTION

The present invention relates generally to the field of computing. More particularly, the invention relates to a method of storing hierarchically-organized data, such as extensible Markup Language (XML) data, in a non-hierarchical data structure such as a relation.

BACKGROUND OF THE INVENTION

Much data is organized in a "hierarchical" format—that is, a format that permits the specification of a hierarchy of structures and sub-structures. For example, extensible Markup Language (XML) is a popular format for representing data, and XML supports a hierarchical format in the sense that data may be "bracketed" with tags, and tags may be nested within other tags.

While it is common to organize information hierarchically, the most common means of storage is a database which stores data in relational tables. Relational tables are not hierarchical; they are "flat." Relational databases store rows of columnar data; the rows may be placed in an order, but a relation has no inherent hierarchical structure. It would be advantageous to represent hierarchically-organized data (such as an XML document) in a "flat" data structure (such as a relation), such that hierarchical structure of the data can be captured and preserved in the flat data structure.

In view of the foregoing, there is a need for a system and method for representing hierarchical data that overcomes the drawbacks of the prior art.

SUMMARY OF THE INVENTION

The present invention provides a technique for representing hierarchical data in a non-hierarchical data structure. Hierarchical data (e.g., XML data) can be viewed as having a "tree" structure. That is, XML data is bracketed by a series of tags; the top level tag corresponds to the root node of the tree; "sub"-tags embedded within the highest-level tag correspond to the children of the root, and so on. Moreover, among the children of a given node in the tree, an order may be defined based on the order in which the various tags (and sub-tags, sub-sub-tags, etc.) appear in the XML document.

This structure may be captured with a position-identifier scheme referred to herein as "ORDPATH." A position-identifier is a label associated with each node represented in hierarchical data. The position identifier captures position information about the node that represents both the level in the hierarchy at which the node appears, as well as the node's relationship to its ancestors and descendants. For example, the root node of a tree may have the position identifier "1", the children may have the identifiers "1.1", "1.3", and "1.5" (skipping the even numbered values, for a reason described below), the children of node "1.1" may be numbered "1.1.1", "1.1.3", etc. This type of position-identifier numbering scheme allows the hierarchical structure of the tree to be represented in the sense that, for any pair of nodes, it is possible to determine which node appears leftmost (or rightmost) in the tree (assuming a document pre-order traversal), and whether one node is an ancestor (or descendant) of the other.

A technique is provided whereby certain numbers (e.g., all even numbers) are used for "indirection," so that a new child node can be inserted between existing nodes after the initial nodes have been stored according to the above-described scheme, and such that the position identifiers continue to capture the hierarchical structure of the tree. Moreover, a technique is provided for representing position identifiers in a compressed format that allows an efficient byte-wise comparison of position identifiers to determine order and ancestry. Additionally, a hybrid numbering scheme is provided that, in certain circumstances, allows shorter-length position identifiers, while still supporting insertion of nodes and the determination of ancestry relationships.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

In many cases, data is hierarchically organized. Data written in extensible Markup Language (XML), where portions of the data may be delimited by a series of nested tags, is a case in point. The present invention provides a technique for storing such hierarchical data in a non-hierarchical data structure such as a relation, while still maintaining information about the hierarchical structure of the data. Thus, hierarchically-organized data may be stored by efficient means, such as a commercial database system.

Exemplary Computing Environment

Figure 1:
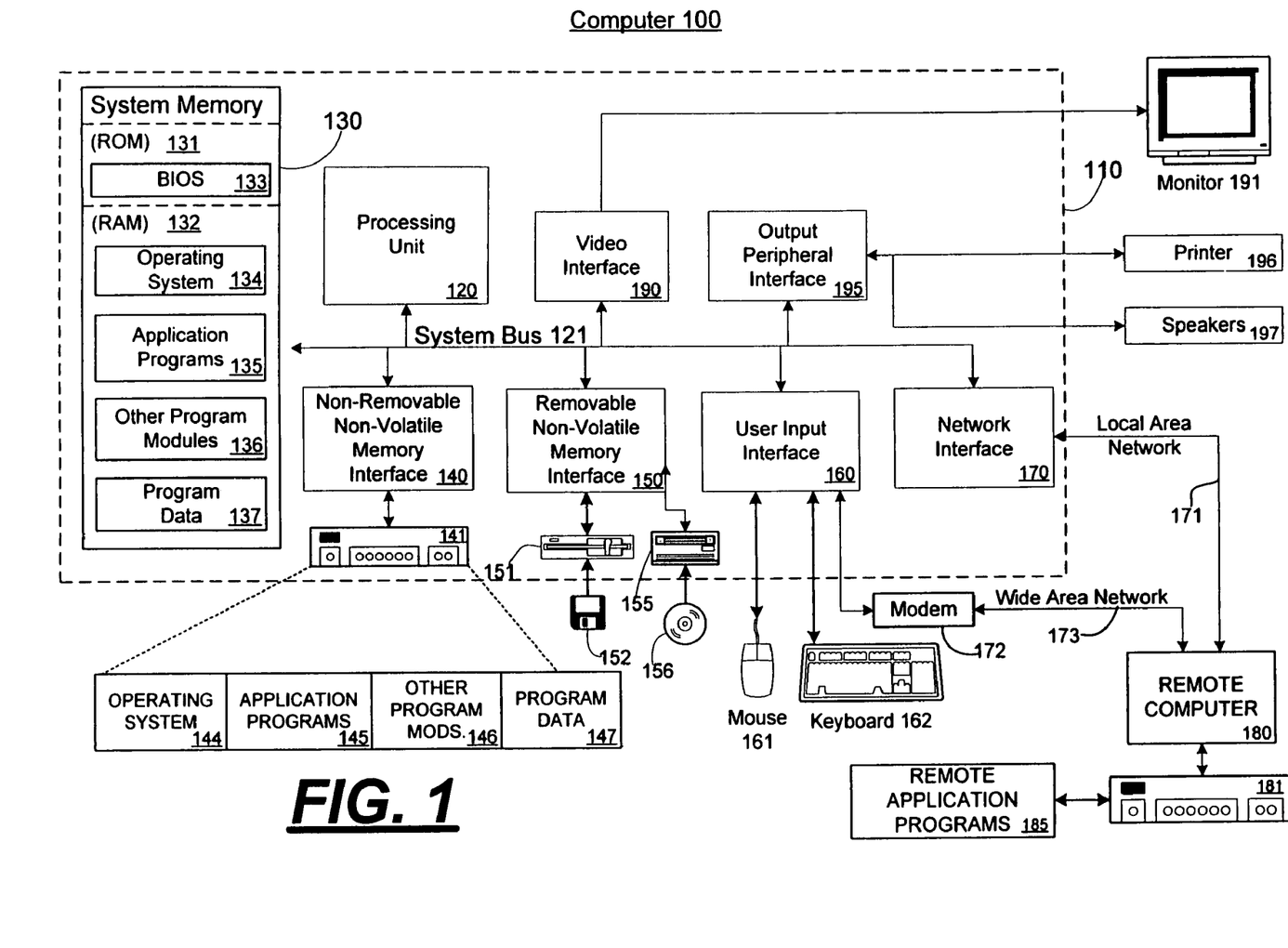
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Hierarchically-Organized Data

Figure 2:
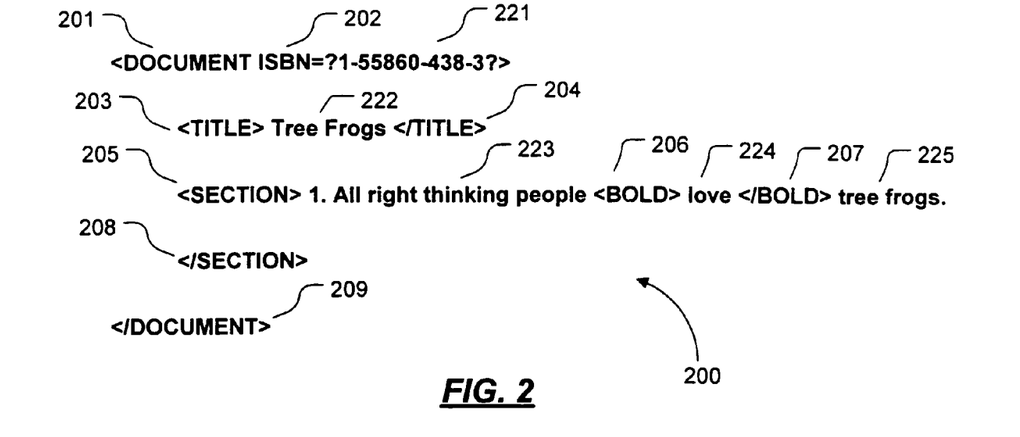
FIG. 2 is a diagram of exemplary data which is hierarchically organized.

FIG. 2 shows an example of hierarchically-organized data. For exemplary purposes, hierarchically-organized data 200 is shown in eXtensible Markup Language (XML). However, it will be understood that XML is merely one way of representing hierarchical data, and that the invention applies to hierarchical data generally, regardless of whether such data is represented in XML.

Exemplary hierarchical data 200 comprises a plurality of tags 201, 203-209. Hierarchical data 200 may also include one or more attribute definitions 202. In XML, "tags" are objects that being with '<' and end with '>', with the user-assigned tag name directly following the '<'. Hierarchical data 200 further includes data items 221-225. Data item 221 is referred to as an "attribute value"—i.e., the value of the attribute ISBN. Data items 222-225 are referred to as "element values." For example, the data 222 delimited by the tag pair "<TITLE>" and "</TITLE>" is an "element value." In general, data items 221-225 represent some type of information, and tags 201, 203-209, as well as attribute definition 202, help to impose a type of hierarchical structure on that information. In exemplary hierarchically-organized data 200, the information represented by the data is a textual narrative about tree frogs.

The structure imposed upon the textual information is defined by tags and attribute definitions. For example, at the highest level, the information is a document, identified by the pair of tags 201 and 209. (By convention in XML, levels of organization are delimited by the convention that an element of the hierarchy begins with a token in the form of "<TAG>" and ends with a token of the form "</TAG>"; by this convention, two such tags are generally required to contain an element.) In exemplary data 200, the document includes a title and one or more sections. The title is delimited by the pair of tags 203 and 204. A section is delimited by the pair of tags 205 and 208. A section may have passages of bold text, which, in this example are delimited by tags 206 and 207. The hierarchical structure of data 200 can be appreciated from the tags: that is, bold text is a component of a section, and a section and a title are a component of a document. Some data in the hierarchy represents an attribute value and does not require delimiters. For example, a document in this example also includes an attribute ISBN number (reference numeral 221), which, in this case, is assigned as an attribute to ISBN attribute 202.

Tree Representation of Hierarchically Organized Data

Figure 3:
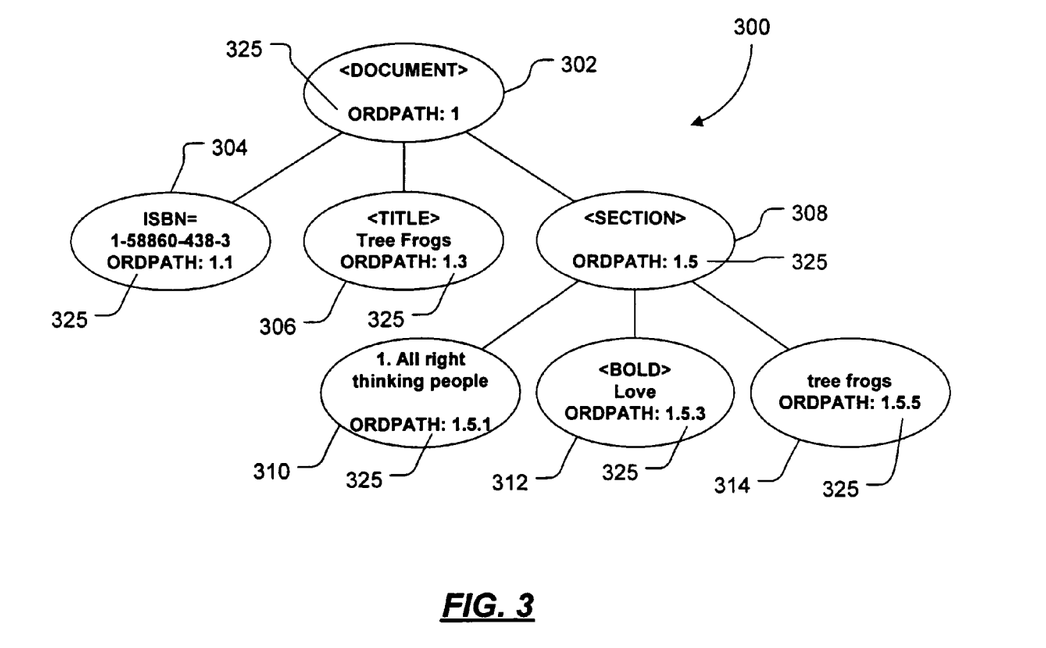
FIG. 3 is block diagram of an exemplary data structure which represents the hierarchically-organized data of FIG. 2.

FIG. 3 shows a tree data structure 300 that represents the hierarchically-organized data 200 depicted in FIG. 2. Tree 300 comprises a plurality of nodes 302-314. The hierarchical structure of data 200 is readily apparent in tree 300. Node 302, which is the highest-level node in the tree, represents the "DOCUMENT" tag, which is the highest-level tag structure in data 200. As noted above, the components of a "document," in this example, are an ISBN number, a title, and a section. These components are represented by child nodes 304, 306, and 308. It will be noted that, among nodes 304, 306, and 308, there is a left-to-right ordering, which corresponds to the order in which those components appear in hierarchically-organized data 200. That is, in data 200, the ISBN number appears before the title, and the title appears before the section. Thus, in tree 300, node 304 representing the ISBN number is the leftmost child of document node 302; node 306 representing the title is to the right of ISBN node 304, and node 308 representing the section is to the right of title node 306.

Section node 308 has child nodes 310, 312 and 314, representing the various components of text in the section. Node 310 represents the text "All right thinking people"; node 312 represents the bold text "love"; and node 314 represents the text "tree frogs." In this example, the section text has been broken up into three components, because it is convenient to represent the bold text between tags 206 and 207 (shown in FIG. 2) as a child node of the "section" that contains that tag pair. By representing the text on either side of the bold text as nodes 310 and 314, the ordering among the bold text and the two pieces of non-bold text is represented in the tree through the left-to-right ordering among nodes 310, 312, and 314. If the text delimited by the <SECTION> AND </SECTION> tags were short and had no tags nested within it, then the section text could simply be represented as an element value in node 308 without the use of child nodes; if the section text is particularly long, or if (as in the example of FIG. 3) the section contains one or more nested tags, then the various pieces of text can be represented as child nodes of node 308.

Each node in tree 300 is assigned a position identifier 325 referred to as an "ORDPATH." Position identifiers 325 represent both the hierarchical and left-to-right position in tree 300 of a given node. That is, given the position identifiers 325 of any two nodes in tree 300, it is possible to determine whether one of the nodes is an ancestor (or descendant) of the other, and, if so, how many "generations" or "levels" separate the nodes. Moreover, it is possible to determine which of the nodes appears to the left (or right) of the other.

The "ORDPATH" shown in FIG. 3 is an exemplary numbering scheme for position identifiers 325. In this numbering scheme, node 302 is assigned the position identifier "1". All child nodes of node 302 are assigned position identifiers that begin with "1"—i.e., "1.1" for node 304, "1.3" for node 306, and "1.5" for node 308. Similarly, since node 308 has position identifier "1.5", all child nodes of node 308 have position identifier that begin with "1.5". Thus, nodes 310, 312, and 314 have position identifiers "1.5.1", "1.5.3", and "1.5.5", respectively.

Information can be derived from these position identifiers 325 in the following manner. First, the number of dot-separated numbers in position identifiers 325 identifies the "depth" of a node within tree 300. That is, the position identifier of node 312, has three dot-separated numbers (i.e., "1", "5", and "3"), and thus is at the third level down from the highest level. These three dot-separated numbers are referred to in precise nomenclature as "component values of an ORD-PATH." Node 302 has only one component value in its position identifier (i.e., "1"), and thus is at the first level in tree 300.

Second, it can be determined whether an ancestor/descendant relationship exists between two nodes. Specifically, the position identifier numbering scheme shown in FIG. 3 obeys the property that a first node is an ancestor of a second node if and only if the first node's position identifier is a prefix of the second node's position identifier. Thus, node 306 cannot be an ancestor of node 312, because node 306's position identifier (i.e., "1.3") is not a prefix of node 312's position identifier (i.e., "1.5.3"). However, it can readily be determined that node 308 is an ancestor of node 312, because node 308's position identifier "1.5" is, in fact, a prefix of "1.5.3." (It will be observed that the highest-level node is labeled "1", which indicates that the node has no ancestor.)

Third, it can be determined how many generations separate two nodes, simply by comparing how many numbers are in the two nodes' respective position identifiers. Thus, it is possible to determine from position identifiers 325 that node 302 is two levels above node 310, because node 302 has position identifier "1" (one component value), whereas node 310 has position identifier "1.5.1" (three component values).

Fourth, it can be determined which of the two nodes precedes the other in a left-to-right preorder traversal of tree 300. For example, it can be determined that node 306 appears before node 310 by comparing the numbers in their position identifiers until a pair of corresponding numbers is encountered that do not match. In the case of nodes 306 and 310, their respective first numbers to match (i.e., both are a "1"), but their second numbers do not match (i.e., node 306 has a "3" in its second component value, but node 310 has a "5"). Since 3 is less than 5, node 306 precedes node 310 in the left-to-right preorder of tree 300. (As discussed below, a position identifier can be represented in a format that allows relative order of two nodes to be determined by a more efficient comparison method.)

It will be appreciated from the foregoing that the hierarchical structure of tree 300 (and thus of the hierarchically-organized data 200 that tree 300 represents) is captured by position identifiers 325. It will further be appreciated that the ORDPATH identifiers shown in FIG. 3 are merely exemplary, and that other types of position identifiers (such as the "ORD-KEY" position identifiers shown below) may be used to represent the hierarchical structure of a tree. Moreover, position identifiers need not be represented by numbers, but rather can be represented using any values selected from a space on which an ordering can be meaningfully defined.

Figure 4:
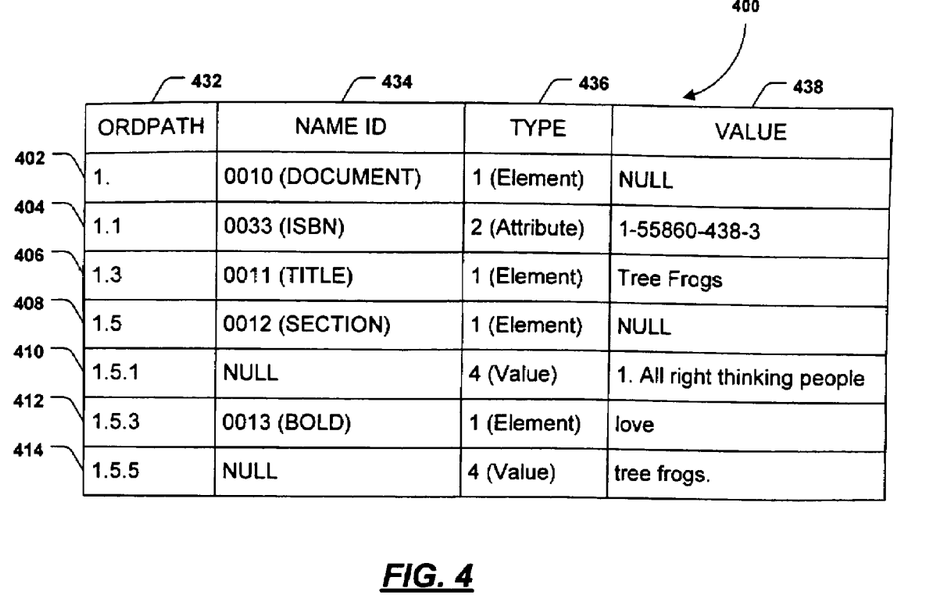
FIG. 4 is a block diagram of an exemplary non-hierarchical data structure which represents the hierarchically-organized data of FIG. 2.

FIG. 4 shows a relation 400 that represents hierarchically-organized data 200, using the position numbering scheme of FIG. 3 to capture the hierarchy. A relation is a table comprising rows and columns. Each column has a name, which is sometimes referred to as an "attribute" (which is different from the "attributes" that may form part of an XML structure, as discussed above). Each row has a value for each column in the relation. A row, in some cases, may be uniquely identified by the values of one or more columns, in which case the one or more columns is referred to as a "key" for the relation. It is known in the art that a relation is a useful data structure for the storage and organization of information. Relations are used for the storage of information in various commercial database systems, such as MICROSOFT SQL Server.

Relation 400 comprises a plurality of rows in a relation (or relational table) 412-424. Each row represents a node in tree 300. For example, row 402 represents node 302, row 404 represents node 304, etc. Relation 400 has a plurality of columns 432-438. Column 432 has the name "ORDPATH," and represents the ORDPATH position identifiers 325 of the nodes of tree 300. Column 434 contains an integer that identifies the given name for each of the nodes in tree 300 ("DOCUMENT", "ISBN", "TITLE", etc.), by reference to the integer primary keys of a separate table constructed to contain all these names. Column 436 represents the type of node identified in column 434 (ELEMENT, ATTRIBUTE, VALUE, etc.). Column 438 contains, for each row, the value stored at the node. It will be observed that, in some cases, a column may have a null value. For example, the nodes represented by rows 410 and 414 have no tag names in column 434, as it will be recalled that the nodes represented by these rows are not generated directly by the presence of tags in data 200, but rather by the decomposition of the text information delimited by the "SECTION" tags. Similarly, row 408, which represents the "SECTION" node of data 200, has no value in column 438, because the information in the "SECTION" tag is represented by the three child nodes 310, 312, and 314, whose values are stored in rows 410, 412, and 414, respectively.

Thus, data 200 and its hierarchical structure is captured in relation 400, even though relation 400 is, itself, "flat" (i.e., non-hierarchical). Using the ORDPATH position identifier stored in column 432, the hierarchical structure of data 200 is readily discernible from relation 400 and can be reconstructed from relation 400. Furthermore, with ORDPATH used as the (clustered) primary key of relation 400, the rows will actually sit on disk in the appropriate document order, making searches in a range within the document more efficient.

Inserting Data Into a Hierarchical Structure

Figure 5:
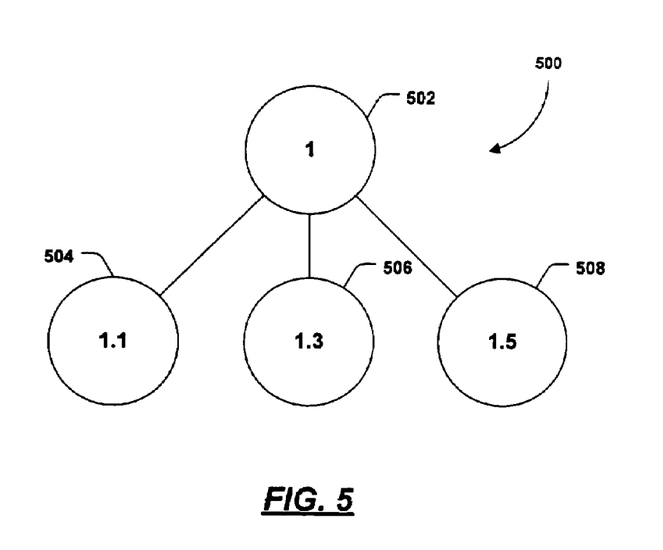
FIG. 5 is a block diagram of an exemplary tree data structure, with tree nodes assigned position identifiers in accordance with an aspect of the invention.
Figure 6:
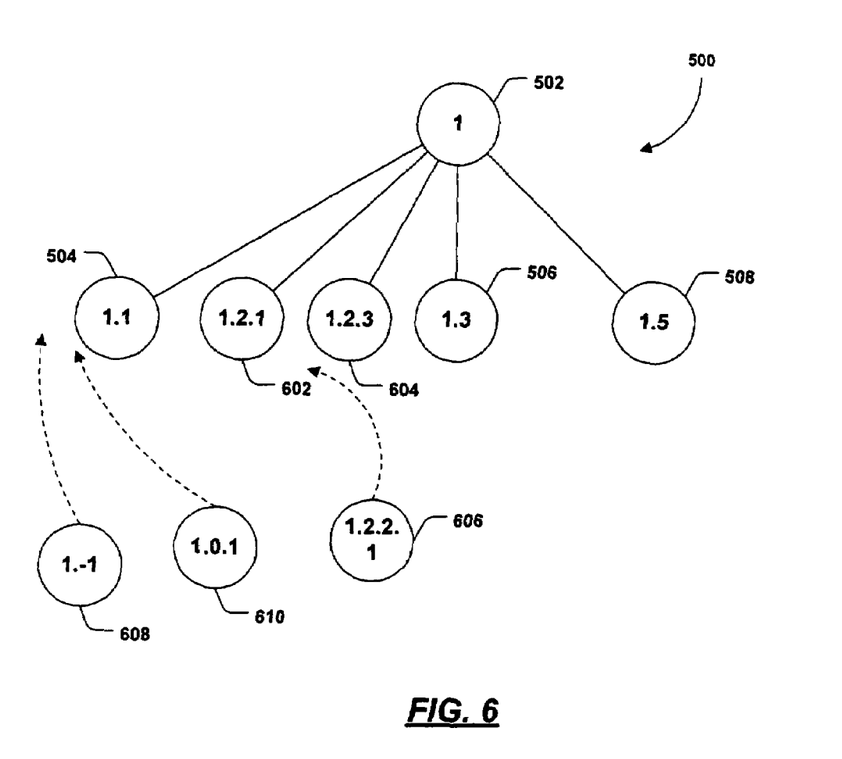
FIG. 6 is a block diagram of the exemplary tree data structure of FIG. 5, with new data inserted therein in accordance with aspects of the invention.

FIGS. 5 and 6 show how data can be inserted (or "careted") into a hierarchical data structure, while still maintaining the valuable properties of the position identifier numbering scheme described above. In FIG. 5, a tree 500 is shown, whose hierarchical structure is captured by a set of position numbers. In the example of FIG. 5, node 502 has position number "1", and node 502's child nodes 504, 506, and 508 have position numbers "1.1", "1.3", and "1.5", respectively. It will be observed that only odd numbers are used in the position numbers for nodes 502-508; in a preferred embodiment, even numbers are explicitly omitted from the numbering scheme. A technique is described below that uses the even numbers for insertion of nodes. However, in an alternative embodiment, nodes can be numbered with consecutive integers as long as it is not necessary to perform insertions in a manner that captures the order of a new node relative to its siblings.

It may be necessary, after tree 500 has been initially constructed, to insert nodes 602 and 604 into tree 500, such that nodes 602 and 604 are child nodes of node 502. Moreover, in the left-to-right ordering among the nodes of tree 500, nodes 602 and 604 may be placed between nodes 504 and 506. In this example, nodes 602 and 604 are assigned position numbers "1.2.1" and "1.2.3", respectively, now becoming sibling nodes to the right of 504 and to the left of 506. In other words, even number component values are skipped in the initial numbering of the nodes, and are reserved for insertions; the even numbered component values are then ignored in terms of component depth in the tree, becoming siblings of nodes with the same number of odd numbered components. This scheme may be carried out recursively. For example, after nodes 602 and 604 have been inserted into tree 500, it may become necessary to insert node 606 as a further child of node 502 between nodes 602 and 604. Node 606, in this example, receives position number "1.2.2.1." This numbering scheme can be carried out for an arbitrary number of insertions, although it may require using arbitrarily long position identifiers. Some insertions on the left or the right of all sibling nodes that are children of a given parent will not require any even numbered components (although insertions to the left of a group of siblings may require a negative odd number—e.g., node 608, which is inserted to the left of the node having position number "1.1", has position number "1.−1".) If node 610 later needs to be inserted in between nodes 608 and 504, the new node 610 will be numbered "1.0.1 (i.e., "0" is the even number between 1 and −1).

FIGS. 5 and 6 show the use of even and odd numbers such that odd numbers are used to represent nodes, and even numbers are used to represent insertion points.

However, it will be appreciated that the use of odd and even numbers is merely exemplary. What is significant about the odd/even numbering scheme is that: (1) it is always possible to distinguish the numbers used for numbering nodes (odd nodes in this example) from numbers that are used to indicate that a node has been inserted (even nodes in this example); and (2) there is always a place to insert between two nodes, because the odd/even numbering scheme ensures that a number is "skipped" between any two nodes. However, it will be understood that any numbering scheme that obeys these properties can be used without departing from the spirit and scope of the invention. For example, nodes could initially be assigned numbers divisible by three (e.g., 3, 6, 9, etc.), with the numbers in between them (e.g., 1, 2, 4, 5, 7, 8, etc.) being used for insertions. A salient feature is that the values used to represent a position are selected from a space of discrete values on which an order can be meaningfully defined (e.g., hexadecimal integers, n-letter words in the Roman alphabet which can be placed in lexical order, etc.), and that only values that are non-adjacent with respect to the ordering are used for the initial assignment of identifiers (so that the unused values in between the non-adjacent values are available for insertions).

A Preferred Structure for Representing Position Identifiers

Position identifiers 325 discussed above are represented by a sequence of dot-separated numbers called "components"; while the format of the component values is ambiguous, it gives the impression of being a text string of digits While such a representation operates to capture the structure of hierarchically-organized data in a "flat" (non-hierarchical) data structure, the following is a preferred structure for representing such position identifiers. The structure described below allows position identifiers to be stored and compared with relatively greater efficiency than the dot-separated numbers described above.

Figure 7:
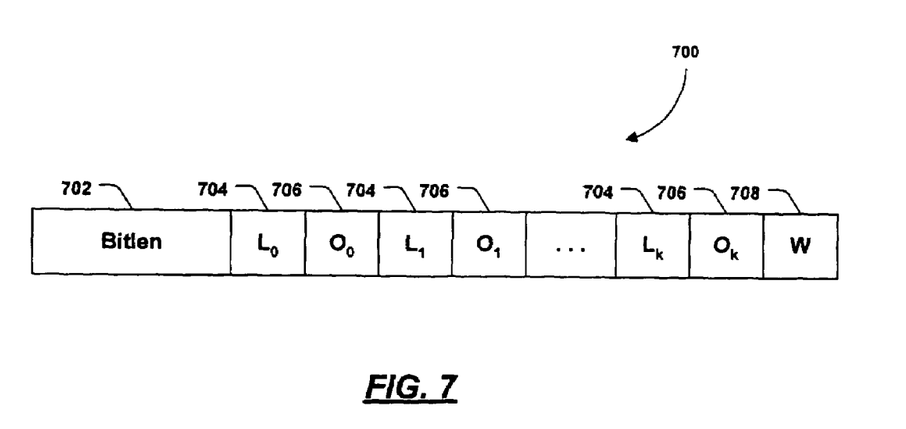
FIG. 7 is a block diagram of an exemplary data structure which may be used to represent hierarchical position data in accordance with a preferred embodiment of the invention.

FIG. 7 shows a preferred data structure 700 for representing a position identifier. Data structure 700 preferably comprises a bit length field 702, a plurality of ordinal length fields 704, a plurality of ordinal value fields 706, and zero to seven "wasted" bits 708, as explained below. Bit length field 702 stores the aggregate number of bits in the plurality of ordinal length fields 704 and ordinal value fields 706. Preferably, the number of bits in the bit length field 702 itself is a multiple of eight (an integral number of bytes) and is not counted in bit length field 702.

In essence, each pair of ordinal length field 704 and ordinal value field 706 (e.g., the pair of $L_i$ and $O_i$, i=0 to k) represents one of the dot-separated numbers in the position identifier described above. Specifically, $O_i$ corresponds to the value of a dot-separated component value, and $L_i$ is the length of $O_i$. The aggregate number of bits in ordinal length fields 704 and ordinal value fields 706 might not be divisible by eight (that is, these fields might not add up to a whole number of bytes). Since data structures are typically embodied as a sequence of whole bytes, there may be some "wasted" bits 708 that are not used to represent any $L_i/O_i$ pair, but are present in data structure 700 to round out the number of bytes to a whole number.

The following is a more detailed description of data structure 700. In each Ordinal component $L_i/O_i$ of a position identifier, $L_i$ gives the length in bits of the succeeding $O_i$. The length values $L_i$ come from a set of bitstrings that have a "prefix property," meaning that there is a way to parse through an $L_i$ bitstring and recognize both the value represented and when the bitstring ends. In essence, the "prefix" property means that no legitimate value for $L_i$ is a prefix for any other legitimate value of $L_i$. One way to create numbers that obey the prefix property is to create a binary tree, where each leaf node in the tree is associated with a binary number that represents the path from the root node to the leaf node (with "0" representing a movement from a node to its left child, and "1" representing a movement from a node to its right child). In this case, the bit sequence associated with the leaf node obeys the prefix property, and this bit sequence is interpreted as the number $L_i$. This method (and others) of creating numbers that obey the prefix property are known in the art and thus are not discussed at length herein. Given the length represented by $L_i$, the following $O_i$ value is of a known length, so it is known where a given $L_i/O_i$ pair ends and the next one (i.e., $L_{i+1}/O_{i+1}$) begins. The particular lengths represented by the L values are preferably chosen to minimize the average length of the $L_i/O_i$ component for the expected number of children at any level of the underlying hierarchical structure that is to be captured in the position identifiers.

The following table shows an exemplary set of $L_i$ values, and the prefix-property-obedient bit sequences that represent them:

| $L_i$ | Bit sequence |
| --- | --- |
| −48 | 00000001 |
| −32 | 0000001 |
| −16 | 000001 |
| −12 | 000010 |
| −8 | 000011 |
| −6 | 00010 |
| −4 | 00011 |
| −3 | 001 |
| 3 | 01 |
| 4 | 100 |
| 6 | 101 |
| 8 | 1100 |
| 12 | 1101 |
| 16 | 1110 |
| 32 | 11110 |
| 48 | 11111 |

Note that the negative $L_i$ values, −48 to −3 in fact represent ordinal lengths of 3 to 48, but indicate that the $O_i$ values will be interpreted as negative numbers, whereas the $L_i$ values 3 to 48 will preface ordinals $O_i$ that represent positive numbers. (As discussed above, it may be necessary to represent certain dot-separated numbers (corresponding to the $O_i$ in this example) as negative numbers, in the case where information is inserted into the hierarchy to the left of existing data. The following discussion concentrates on the positive $L_i$ values.

When position identifiers are assigned to nodes in a hierarchy, odd ordinal numbers are used for successive sibling children of any node, (e.g., 1, 3, 5, 7, . . . ); as discussed above, this use of odd numbers facilitates the insertion of information into an existing structure by using even numbers to represent the insertion. In this example, lengths of zero, one and two are not assigned prefix-property-obedient bit strings; thus, all $O_i$ have lengths of at least three bits. Using an L value of 3, it is possible to represent four odd ordinals values (i.e., 1, 3, 5, 7, corresponding to the bit strings 001, 011, 101, and 111) in a component $O_i$ with Length $L_i$=3. For example, the following is a representation of the position identifier "3.1.7.5" in the format of FIG. 7:

| 00010100 | 01 | 011 | 01 | 001 | 01 | 111 | 01 | 101 | 0000 |
|---|---|---|---|---|---|---|---|---|---|
| Bitlen = 20 | $L_0 = 3$ | $O_0 = 3$ | $L_1 = 3$ | $O_1 = 1$ | $L_2 = 3$ | $O_2 = 7$ | $L_3 = 3$ | $O_3 = 5$ | W |

Preferably, the minimum length $L_i$ is used to represent an ordinal value $O_j$, so the value 9 (or 8) requires $L_i = 4$. In this case, it is not necessary to have repetitive representations of $O_j$ values—that is, there is no need to be able to represent the value 3 both in a three-bit string and a four-bit string. Thus, for $L_i = 4$, the ordinal value 8 is represented by 0000, 9 is represented by 0001, etc. Under this scheme, the following table shows the $O_i$ values that can be represented by the various values of $L_i$:

| $L_i$ | Integers Represented in $O_i$ | Map bit representation $b_m b_{m-1} b_{m-2} \ldots$ to value $O_i$ |
|---|---|---|
| 3 | 0 to 7 ($2^3 - 1$) | $O_i$ value is integer represented by bits $b_2 b_1 b_0$ |
| 4 | 8 to 23 ($2^3 + 2^4 - 1$) | $O_i$ value is $8 + b_3 b_2 b_1 b_0$ |
| 6 | 24 to 87 ($2^3 + 2^4 + 2^6 - 1$) | $O_i$ value is $24 + b_5 b_4 b_3 b_2 b_1 b_0$ |
| 8, 12, 16, 32, 48 | 88 to $88 + 2^8 + 2^{12} + \ldots + 2^{48} - 1$ | At $L_i = 48$, $O_i$ value is $88 + 2^8 + 2^{12} + \ldots + 2^{48} - 1 + b_{47} \ldots b_0$ |

The above table uses 48 as the highest possible value for $L_i$, although it will be appreciated that a position numbering scheme can be designed with arbitrarily large $L_i$ values.

Under the exemplary number scheme described above, the following is a representation of the position identifier "7.99.1.17.87" in accordance with the format of FIG. 7:

$L_i$ may be encoded separately for each position identifier and might be different for components on the same level—even of sibling children, if, for example, one sibling has ordinal value of 7 in its final component, and the next sibling has an ordinal value of 9. Because of this flexibility, a sequence of increasing ordinal numbers for children of a given node can be inserted at any time, with increasing L as needed. It is also possible to insert a sequence of decreasing (negative) ordinals using the "negative" $L_i$ values shown above. The following table shows corresponding $O_i$ values for those negative $L_i$ values.

| $L_i$ | Integers Represented in $O_i$ | Map bit representation $b_m b_{m-1} b_{m-2} \ldots$ to value $O_i$ |
|---|---|---|
| −3 | −1 to −8 = −($2^3$) | $O_i$ value is $-8 + b_2 b_1 b_0$ |
| −4 | −9 to −24 = −($2^3 + 2^4$) | $O_i$ value is $-24 + b_3 b_2 b_1 b_0$ |
| −6 | −25 to −88 = −($2^3 + 2^4 + 2^6$) | $O_i$ value is $-88 + b_5 b_4 b_3 b_2 b_1 b_0$ |
| −8, −12, …, −48 | −89 to $-89 - 2^8 - 2^{12} - \ldots - 2^{48}$ | $-89 - 2^8 - 2^{12} - \ldots - 2^{48} + b_{47} \ldots b_0$ |

| 00100110 | 01 | 111 | 1100 | 00001011 | 01 | 001 | 100 | 1001 | 101 | 111111 | 00 |
|---|---|---|---|---|---|---|---|---|---|---|---|
| Bitlen = 38 | $L_0 = 3$ | $O_0 = 7$ | $L_1 = 8$ | $O_1 = 99$ (11 + 88) | $L_2 = 3$ | $O_2 = 1$ | $L_3 = 4$ | $O_3 = 17$ (9 + 8) | $L_4 = 6$ | $O_4 = 87$ (63 + 24) | W |

The following is a representation of the position identifier "−7.99.1.−17.87" in accordance with the format of FIG. 7.

| 00101001 | 001 | 001 | 1100 | 00001011 | 01 | 001 | 00011 | 0111 | 101 | 111111 | 0000000 |
|---|---|---|---|---|---|---|---|---|---|---|---|
| Bitlen = 41 | $L_0 = -3$ | $O_0 = -7$ | $L_1 = 8$ | $O_1 = 99$ (11 + 88) | $L_2 = 3$ | $O_2 = 1$ | $L_3 = -4$ | $O_3 = -17$ (7 − 24) | $L_4 = 6$ | $O_4 = 87$ (63 + 24) | W |

Comparison of Position Identifiers

When position identifiers are represented in the format of FIG. 7, it is possible to compare two position identifiers using the algorithm described below.

Consider two distinct ORDPATHs, X and X' shown below

| X | Bitlen | $L_0$ | $O_0$ | $L_1$ | $O_1$ | … | $L_k$ | $O_k$ | … |
|---|---|---|---|---|---|---|---|---|---|
| X' | Bitlen' | $L'_0$ | $O'_0$ | $L'_1$ | $O'_1$ | … | $L'_k$ | $O'_k$ | … |

It is possible to perform a byte-by-byte comparison of the X and X' strings, starting after the Bitlen element, and running for the byte-length of the shorter string (this is (min(Bitlen, Bitlen')+7)/8 bytes). If at some point during the comparison it is found that X<X' (that is, a given byte of X has a lower value than the corresponding byte of X'), then X comes earlier in document order than X'. (This may also mean that X is an ancestor of X' if X has the shorter byte-length.)

This type of comparison works for the following reason: if, during the byte-by-byte comparison, the first non-equality between X and X' is discovered in an L value and $L_i < L'_i$, then, as described in the tables above, $O_i$ is less than $O'_i$, —that is, since $O_i$ values do not have repetitive representations in different lengths, a greater length implies a greater $O_i$ value range. As described above in connection with the position identifier numbering scheme, a lower value for $O_i$ (assuming that all previously values for $O_i$ and $O'_i$ have been equal) implies that $O_i$ appears earlier than $O'_i$ in document order. On the other hand, if the first difference between X and X' is discovered in an $O_i$ value and $O_i < O'_i$, then the ordinal values are known directly (rather than by inference from their length), and their L values match, so it is again known that X precedes X'.

It should be noted that this document-order comparison works even when wasted bits 708 are used in the comparison. In other words, the ordinary byte-by-byte binary string comparison is sufficient for document-order determination. However, ancestry information may be determined along with document-order information, and in this case, the byte containing the W bits needs special handling. If the wasted bits W at the end of the shorter string (say it is X) contains one or more zero bits, then even if the final $L_k/O_k$ of the shorter string compares equal to the $L'_k/O'_k$ of the longer string, W is likely to compare low to the $L_i$ that begins at this point in X'. In determining ancestry therefore, it is only necessary to compare the leftmost min(Bitlen, Bitlen') %8 bits under an unsigned mask of the last byte, masking out W, and if there is an equal match for the full length of the shorter string X, then X is an ancestor of X'.

Using the above-described logic, a cmpordp (X, Y) function on two ORDPATHs X and Y can be created which returns (M, N). Where M and N represent the following results:

If M<0, >0, or =0, then X is shorter, the same length, or longer than Y, accordingly.

Ancestry can be determined according to the following rules:
  X is an ancestor of Y if and only if N=0 and M<0;
  X is the same node as Y if and only if N=0 and M=0;
  Y is an ancestor of X if and only if N=0 and M>0;

Document order can be determined according to the following rules:
  X precedes Y in document order if and only if N<0 or (N=0 and M<0);
  X is the same node as Y if and only if N=0 and M=0 (see same rule above regarding ancestry);
  Y precedes X in document order if and only if N>0 or (N=0 and M>0).

Figure 8:
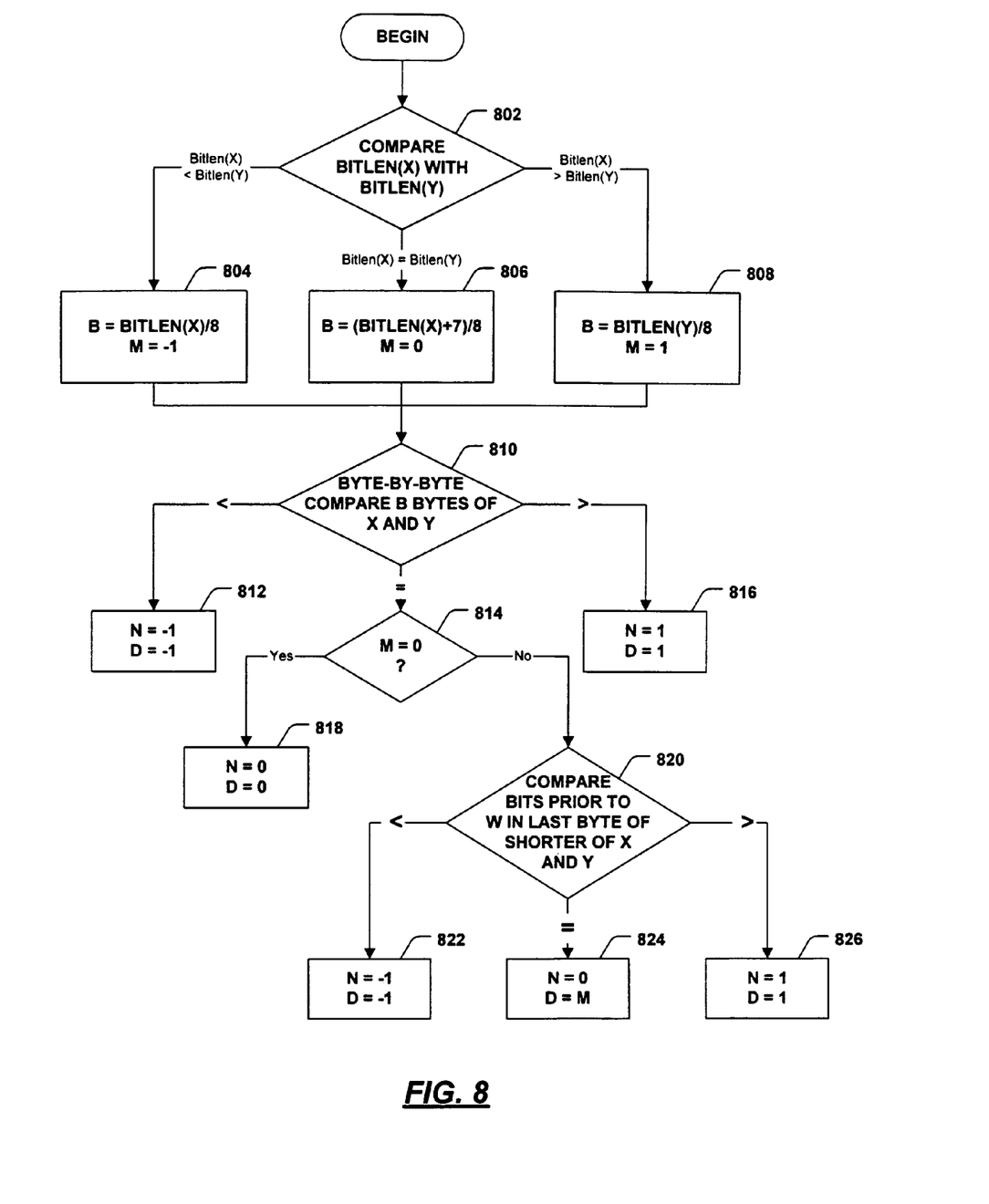
FIG. 8 is a flow diagram of an exemplary process of comparing position information for two nodes in a hierarchical data structure.

FIG. 8 describes an exemplary process for carrying out the cmpordp (X, Y) function. At step 802, the bit lengths of X and Y (i.e., bitlen fields 702, shown in FIG. 7) are compared. If the bit length of X is less than the bit length of Y, then B is set to bitlen(X)/8, and M is set to −1 (step 804). (B represents the number of bytes of X and Y to be compared at step 810, as described below.) If the bit length of X is equal to the bit length of Y, then B is set to (bitlen(X)+7)/8, and M is set to 0 (step 806). If the bit length of X is greater than the bit length of Y, then B is set to bitlen(Y)/8, and M is set to 1 (step 808). Regardless of whether decisional step 802 leads to step 804, 806, or 808, the process continues to step 810.

At step 810, a byte-by-byte comparison is performed of the first B bytes of X and Y, and the flow proceeds to either block 812, 814, or 816 according to the result of the comparison. Specifically, bytes of X and Y are compared from left to right until a byte is identified in X whose value is different from the corresponding byte in Y, or until all B bytes have been compared. If the identified byte in X is less than the corresponding byte of Y, then the process continues to step 812, where N is set to −1, and D is set to −1. (D represents a conclusion as to the relative document order of X and Y; X precedes, follows, or is the same node as Y according to whether D=−1, 0, or 1. D may be returned as an additional result of cmpordp (i.e., cmpordp may return the tuple (M, N, D), or D may deduced from M and N as described in the bullet list above.) If, on the other hand, the identified byte in X is greater than the corresponding byte in Y, then the process continues to step 816, where N is set to 1 and D is set to 1. If the comparison proceeds through all B bytes without any difference having been found between X and Y, then the process continues to step 814.

At step 814, if M=0, then the process continues to step 818, where N is set to 0 and D is set to 0. If M is not equal to 0, then the process continues to step 820, where certain bits of X and Y are compared. Specifically, the last byte in either X or Y (whichever is shorter) is identified. Within this byte, the bits that precede "wasted" bits W are identified. Step 814 compares X and Y with regard to these identified bits. Since the bits to be compared may be less than one full byte, the comparison can be performed in practice by constructing a mask and performing a bitwise logical AND between the relevant byte and the mask. If the identified bits are less in X than in Y, the process continues to step 822, where N is set to −1, and D is set to −1. If the identified bits are equal in X and Y, then the process continues to step 824, where N is set to 0, and D is set to the value of M. If the identified bits in X are greater than the identified bits in Y, then the process continues to step 826, where N is set to 1 and D is set to 1.

When this process has been carried out, if N=0, then X is an ancestor of Y if M<0, Y is an ancestor of X if M>0, and X is the same node as Y if M=0. Moreover, X precedes Y in document order if D=−1, Y precedes X in document order if D=1, and X is the same node as Y if D=0.

Alternative Representations of Position Identifiers

In some hierarchical structures, such as XML trees, it may occur that a small numbers of nodes exist at very deep levels of nesting, and thus the position identifiers for these nodes might have overly long primary keys. This would increase the size of secondary indexes that use primary keys to identify rows indexed. An alternative position identifier called an "ORDKEY" may be used to reduce the size of position identifiers.

Such a reduced-size position identifier for an existing tree may be created by passing through the nodes of the tree in pre-order, and generating only $L_0/O_0$ pair with ordinal values 1, 2, 3, . . . for all nodes, regardless of ancestry. This numbering scheme preserves document order but ignores ancestry.

Later insertions within the tree will can be performed using a variant of the insertion technique described above—that is, a sequence of nodes between nodes numbered 2 and 3 will have numbers 2.1, 2.2, 2.3, etc. It is not necessary to use the odd-and-even numbering scheme described above because the "flat" nature of an "ORDKEY" numbering scheme causes the sibling/child relationship to be undifferentiated, so everything can be considered a sibling. Note that inserting a subtree of nodes in any order other than pre-order generates a multi-level position identifier (i.e., with many $L_i/O_i$ values for a given position identifier). Flattening the subtree in this case requires local reorganization.

Since ancestry information is not implicit in an "ORDKEY" representation, a "last descendent" concept may be used to supply ancestry information to "ORDKEY"-labeled nodes. If the position identifier for a node N is represented by ID, and LD represents the "Last Descendent" of N, then a node M having position identifier ID* will be a descendent of N if and only if: ID<ID*<=LD. This is called the "LD property". We would normally think of ID and LD as existing as a primary key pair in the same node (ID is unique, but LD adds to the information carried in the primary key). This technique requires maintaining an LD value for each node. A preferred method for generating LD values during a document order load of the nodes is described below.

In order to generate LD values, the tree is traversed in document pre-order. Pre-order of the nodes of the tree is leftmost depth first, ascending after there is no lower leftmost node to go to, and then advancing to the next node in document order, which is still the leftmost lowest node still unvisited. The next available ID is assigned to the node as a "descendant limit" (DL) value as the tree is descended to the right (skipping over DL values that have already been set). We keep track of the rightmost nodes at each level in the descending path to the last (and deepest) one inserted—all these nodes have ID assigned, but have not yet been assigned DL values—all prior nodes not on the rightmost path also have DL assigned. When we go UP in pre-order (because there are no more left-hand siblings below), we immediately assign the next ID value in order as a DL, and use that DL for the node we're leaving at the lowest level and every node we pass while going UP. As soon as we start down again (with a right-hand child of a higher-level node reached while going UP), we skip over the DL we've been using in order to assign the next ID.

At any time we need only keep a stack of nodes in the rightmost path. These all have ID's assigned, but are not yet assigned DLs. When the final rightmost node is placed in the document, the tree will only be ascended thereafter, generating a single DL that is used for every node we pass going on the way up and finally for the root as well.

As the tree is traversed, an ID can be placed in all secondary index entries, and there may also be an index correlating ID to DL, which is indeterminate on the rightmost path at any time. The DL values for the rightmost path ID's may be filled in as infinity, since there is nothing to the right of the rightmost path, and everything will work for range searches.

The above-described technique can be generalized to subtrees, except that the DL for nodes having the subtree root on the rightmost descendent path will be indeterminate as well, and will have to be reset when the subtree insert is complete.

The "ORDKEY" approach to position numbering can be combined with the "ORDPATH" position numbering scheme described above in numerous ways to create hybrid architectures, obviating the need for determining a Last Descendent LD or Descendent Limit DL for each ORDKEY ID. For example, an "ORDKEY" identifier may be used as a Primary Key and provide an parallel "ORDPATH" identifier in the node itself or as a node in an auxiliary table with the "ORDKEY" as the primary key, to be accessed when ancestry information is desired.

Other hybrid schemes may be created as well, and are within the spirit and scope of the invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer-readable storage medium configured to store hierarchically-organized data in a non-hierarchical format, said hierarchically-organized data having at least a first node at a first level and a plurality of second nodes at a second level, the second nodes being child nodes of the first node, the first and second nodes each having a corresponding data item associated therewith, the hierarchically-organized data comprising:

a plurality of rows each having a plurality of fields, each of said rows corresponding to a data item associated with a one of the first and second nodes, the fields of each row comprising:

a first field which stores the data item associated with the one of the nodes that corresponds to the row; and a second field which stores a position identifier which identifies the level at which the node that corresponds to the row is located in the hierarchically-organized data, and which comprises information from which can be identified the relative left-to-right position of the node that corresponds to the row as compared with other nodes at the same level as the node that corresponds to the row, and which further indicates one of: (a) an identity of an ancestor node of the node that corresponds to the row, or (b) the fact that the node that corresponds to the row has no ancestor, each position identifier including a bit length field, a plurality of ordinal length fields, and a corresponding plurality of ordinal value fields, wherein the bit length field is indicative of the aggregate number of bits present in the plurality of ordinal length fields and the corresponding plurality of ordinal value fields;

wherein the position identifier corresponds to the location of the row of the node and the relative left-to-right location of the node;

whereby position of a given node is determined by a corresponding position identifier.

2. The computer-readable storage medium of claim 1, wherein the hierarchically-organized data comprises a relation in a relational database.

3. The computer-readable storage medium of claim 1, wherein the hierarchically-organized data comprises data in a hierarchical markup language.

4. The computer-readable storage medium of claim 3, wherein said hierarchical markup language comprises eXtensible Markup Language (XML), and wherein the fields of each row further comprise:

a name identifier identifying a user-assigned XML name; and a data type.

5. The computer-readable storage medium of claim 1, wherein the position identifier of the first node comprises a first value in a space of ordered values, and wherein the position identifiers of each of the second nodes comprises said first value and a second value in said space of ordered values.

6. The computer-readable storage medium of claim 5, wherein an order is defined among the second nodes, and wherein the second values associated with the second nodes are respective of said order with respect to said space of ordered values.

7. The computer-readable storage medium of claim 6, wherein said space of ordered values comprises the set of integers, wherein said first value is a "1", and wherein the second values for the second nodes are decimal integers in an increasing series of decimal integers.

8. The computer-readable storage medium of claim 1, wherein the position identifier further comprises at least one wasted bit, and further wherein the aggregate number of bits in the bit length field is a multiple of eight.

9. The computer-readable storage medium of claim 1, wherein at least one of the ordinal length fields contains a negative value to indicate that each value in the corresponding ordinal value field is a negative value.

10. A method of representing hierarchically-organized data, the hierarchically-organized data comprising at least a first node at a first level and a plurality of second nodes at a second level, the second nodes being child nodes of the first node, an order being defined among the second nodes, the first and second nodes each having a data item associated therewith, the method comprising:
   assigning a first position identifier to the first node, wherein said first position identifier comprises a first value selected from an ordered space of values;
   assigning a second position identifier to each of the second nodes, each of the second identifiers comprising said first value separated by a period identifier from a second value selected from said ordered space of values, wherein the second values are assigned to the second nodes respectively of the order; and
   storing, in a non-hierarchical data structure, a plurality of data records, wherein each of the plurality of data records corresponds to one of the first or second nodes, and wherein each data record includes, for its corresponding node:
      the position identifier associated with the node, wherein the position identifier corresponds to row location of the node and relative left-to-right location of the node; and
      the data item associated with the node,
   wherein each position identifier includes a bit length field, at least one ordinal length field, and a corresponding ordinal value field, wherein the bit length field is indicative of the aggregate number of bits present in the ordinal length field and the corresponding ordinal value field;
   whereby position of a given node is determined by a corresponding position identifier.

11. The method of claim 10, wherein said non-hierarchical data structure comprises a relational database, and wherein each of said data records comprises a row of a relation in said relational database.

12. The method of claim 10, wherein said hierarchically-organized data comprises data in eXtensible Markup Language (XML) having a plurality of tags, each of said tags delimiting a portion of the hierarchically-organized data, said tags being nestable, and each of said tags and its delimited data corresponding to one or more nodes in the hierarchically-organized data.

13. A system for storing hierarchically-organized data in a non-hierarchical format, the hierarchically-organized data comprising at least a first node at a first level and a plurality of second nodes at a second level, the second nodes being child nodes of the first node, each of the first and second nodes having a data item associated therewith, the system comprising:
   a computer-readable storage medium having stored thereon, the hierarchically-organized data in the form of a relational table having a plurality of rows, each of said rows corresponding to a node in the hierarchically-organized data, the relational table having a plurality of columns, the columns comprising:
      a first column which stores a position identifier indicative of the level at which the node that corresponds to the row is located in the hierarchically-organized data, and further indicative of an ancestor of the node that corresponds to the row, and further indicative of information from which a relative left-to-right position of the node that corresponds to the row, as compared with other nodes at the same level as the node that corresponds to the row, can be derived; and
      a second column which stores the data item associated with the node that corresponds to the row; and
   wherein the computer-readable storage medium further contains a relational table manager which inserts and retrieves the rows from the relational database,
   each position identifier including a bit length field, at least one ordinal length field, and a corresponding ordinal value field, wherein the bit length field is indicative of the aggregate number of bits present in the ordinal length field and the corresponding ordinal value field;
   wherein the position identifier corresponds to the location of the row of the node and the relative left-to-right location of the node;
   whereby position of a given node is determined by a corresponding position identifier.

14. The system of claim 13, wherein said relational table manager comprises a database management system.

15. The system of claim 13, wherein the hierarchically-organized data comprises eXtensible Markup Language (XML) data.

16. The system of claim 13, wherein said XML data comprises a plurality of tags which delimit portions of the hierarchically-organized data, said tags being nestable, wherein each of said tags and its corresponding delimited data corresponds to one or more nodes in the hierarchically-organized data, and at least some of the rows in said relational table further comprise:
   a tag identifier indicative of the tag associated with the node that corresponds to the row; and
   a type identifier indicative of a type of the data delimited by the tag indicated by the row's tag identifier.

17. A computer-readable storage medium configured to store hierarchically-organized data in a non-hierarchical format, said hierarchically-organized data having at least a first node at a first level and a plurality of second nodes at a second level, the second nodes being child nodes of the first node, the first and second nodes each having a corresponding data item associated therewith, the hierarchically-organized data comprising:
   a plurality of rows each having a plurality of fields, each of said rows corresponding to a data item associated with a one of the first and second nodes, the fields of each row comprising:
      a first field which stores the data item associated with the one of the nodes that corresponds to the row; and
      a second field which stores a position identifier which identifies the level at which the node that corresponds to the row is located in the hierarchically-organized data, and which further indicates one of: (a) an identity of an ancestor node of the node that corresponds to the row, or (b) the fact that the node that corresponds to the row has no ancestor, wherein the position identifier corresponds to row location of the node and relative left-to-right location of the node;

wherein the position identifier of the first node comprises a first odd integer value in a space of ordered values, and wherein the position identifiers of each of the second nodes comprises said first odd integer value followed by a second odd integer value in said space of ordered values, wherein an order is defined among the second nodes, wherein the second odd integer values associated with the second nodes are respective of said order with respect to said space of ordered values, wherein said hierarchically-organized data comprises an inserted node which is a child of said first node and which is located between first and second ones of said second nodes, said inserted node having a position identifier associated therewith, wherein the position identifier for the inserted node comprises said first odd integer value, followed by an even integer value having a magnitude between the second odd integer values associated with said first and second ones of said second nodes, and further followed by an additional odd integer value;

whereby position of a given node is determined by a corresponding position identifier.

18. The computer-readable storage medium of claim 17, wherein each integer value in each position identifier is separated from the following integer value by a dot designator.

19. The computer-readable storage medium of claim 17, wherein at least one of said integer values is a negative integer.

20. The computer-readable storage medium of claim 17, wherein said second integer value is separated from said first integer value by at least a magnitude of three.

* * * * *